United States Patent [19]
Libby et al.

[11] Patent Number: 5,722,890
[45] Date of Patent: Mar. 3, 1998

[54] LOTTERY SYSTEM

[75] Inventors: Budd O. Libby, Dunwoody; Daniel W. Bower, Atlanta, both of Ga.

[73] Assignee: Telecom Productions, Inc., Atlanta, Ga.

[21] Appl. No.: 546,365

[22] Filed: Oct. 20, 1995

[51] Int. Cl.$^6$ ................................................. A63F 3/00
[52] U.S. Cl. ........................... 463/17; 463/16; 463/40; 463/31
[58] Field of Search ........................ 463/1, 16–19, 463/22, 30–31, 36, 40; 364/410–412; 273/139, 246, 269

[56] References Cited

U.S. PATENT DOCUMENTS

| | | | |
|---|---|---|---|
| 4,257,107 | 3/1981 | Heymsfield et al. | 364/560 |
| 4,288,077 | 9/1981 | Rose et al. | 273/246 |
| 4,339,798 | 7/1982 | Hedges et al. | 463/40 |
| 4,429,877 | 2/1984 | Coppock | 273/139 |
| 4,494,197 | 1/1985 | Troy et al. | 463/18 |
| 4,540,174 | 9/1985 | Coppock | 463/40 |
| 4,689,742 | 8/1987 | Troy et al. | 463/18 |
| 4,752,836 | 6/1988 | Blanton et al. | 395/119 |
| 4,873,585 | 10/1989 | Blanton et al. | 395/119 |
| 4,883,636 | 11/1989 | Fantle, Jr. | 273/269 |
| 4,951,039 | 8/1990 | Schwendeman et al. | 463/40 |
| 5,035,422 | 7/1991 | Berman | 273/269 |
| 5,069,453 | 12/1991 | Koza et al. | 463/40 |
| 5,212,636 | 5/1993 | Nakazawa | 463/40 |
| 5,283,734 | 2/1994 | Von Kohorn | 463/40 |
| 5,351,970 | 10/1994 | Fioretti | 463/19 |
| 5,354,069 | 10/1994 | Guttman et al. | 273/269 |
| 5,415,416 | 5/1995 | Scagnelli et al. | 463/41 |
| 5,518,239 | 5/1996 | Johnston | 273/139 |

*Primary Examiner*—Jessica Harrison
*Assistant Examiner*—Mark A. Soger
*Attorney, Agent, or Firm*—Cooper & Dunham LLP

[57] ABSTRACT

A computerized lottery (or wagering) system that permits players to select game parameters from remote locations, transfers the selected parameters to a game generator and broadcasts the lottery game on television for public viewing. The broadcasted game may be a race and the game parameters are numbers associated with the participants in the race. Examples of the games contemplated include horse races, dog races, car races and motorcycle races. At a predefined time of day, selection of the game parameters is ended and the game is then broadcast on television so that the players can watch the game and root for their selections. In addition, the system of the present invention determines which players are eligible for a grand prize pool and after the broadcast of the game announces the grand prize winner.

9 Claims, 7 Drawing Sheets

LOTTERY SYSTEM

BACKGROUND OF THE INVENTION

1. Field of Invention

The present invention relates to computerized wagering systems, and more particularly to lottery or wagering games wherein the winners are announced live to a television audience.

2. Description of the Related Art

Many states have used lottery or on-line games, such as number games and "instant winner" games, as an added source of revenue. These games have become quite popular and successful.

One type of numbers game involves the use of numerous remote computer stations located in stores throughout the state which communicate with a central computer. A customer seeking to play the game marks the numbers he wishes to enter as his choices in a computer scannable or readable entry form. The customer pays the entry fee, usually no more than a few dollars, and the store clerk feeds the entry form into a card reader controlled by the computer, which registers the numbers selected and an ID number in the central computer. After wagering has been closed to new entries, a carefully monitored selection committee chooses the winning numbers. This may involve for example, operating a machine loaded with balls having eligible numbers marked thereon to select at random the appropriate number of balls. This selection process often is broadcast on local television stations so that contestants can watch to see if their numbers have been selected. While many varieties of such games exist, examples of patents relating to this general scheme include U.S. Pat. Nos. 4,689,742 (Troy) and 4,494,197 (Troy).

U.S. Pat. No. 5,035,422 (Berman) appears to discuss an interactive game show which seeks to allow home viewers to select an outcome from a number of possible choices and to share in the prizes awarded on the show. Similarly, U.S. Pat. No. 5,283,734 (Van Kohorn) discusses an interactive television wagering system whereby audience members can enter a response to a situation presented on television by entering a response on a keyboard. According to the patent, lottery games may be played by entering numbers at remote stations and stored in a central computer. The winning numbers are selected and presented at a remote station, following which winners can redeem their tickets.

Another computerized lottery wagering system is apparently discussed in U.S. Pat. No. 5,415,416 (Scangelli). This system appears to direct a telephone caller with an automatic call director through a number of selections to assist the caller in placing a bet; the cost of the bet is charged to a credit or debit card. The system assigns an associated ticket number to each customer.

Each of the above-identified patents is incorporated by reference herein in their entirety as illustrative of the background and state of the art of the present invention.

While the foregoing patents attempt to make lotteries more accessible to bettors, they do not vary much from standard on-line games. It appears that states and other entities running such lottery games have experienced some difficulty in increasing the number of interested day-to-day participants, and in maintaining the day-to-day interest of those who do participate on a regular basis.

As a result, a need exists for a lottery game which enhances the intrinsic excitement of the game to maintain and preferably increase the interest of those who do not play often, as well as the interest of everyday players.

SUMMARY OF THE INVENTION

The present invention provides method for improving lottery games and enhancing participant excitement by changing the method of selecting randomly generated lottery winners in a numbers game featuring numerous entries.

The method of conducting a lottery according to the present invention initially issues a plurality of lottery tickets each bearing a sequence-specific subset of K different integers, defining for example horses in a horse race, that are selected from a predetermined set of integers. The value of K is a predetermined constant and the number of integers in the set are larger than K. The plurality of tickets includes tickets bearing different sequence-specific subsets of K integers of the set.

Each issued ticket is assigned a unique multidigit identifier which identifies the ticket with the player making the selection. The identifiers of all issued tickets are stored for selective retrieval. After all the tickets are issued, one sequence-specific subset of K different integers from the set is randomly selected, and the identifiers of all issued tickets bearing the one sequence-specific subset are selectively retrieved from memory. One of the retrieved identifiers and the ticket to which the one identifier is assigned is randomly selected to determine the winning ticket of the lottery.

Preferably, the method of the present invention further includes the step of generating an animated video display representing a horse race, after all the tickets are issued. The horse race has a number of horses equal to the number of integers in the set and respectively designated in the display by the integers of the set. The display is generated so that there are win, place and show horses therein which are designated by the first, second and third integers of the one sequence-specific subset.

The present invention also provides a lottery system having in one embodiment a game generator connected to a plurality of existing remote vendor stations through an existing central lottery station. In another embodiment, the game generator may be connected directly to the remote stations.

The plurality of remote vendor stations are configured to provide predetermined game parameters to a player for selection using, for example, a keyboard. Typically, the selected game parameters are entered by an operator of the remote vendor station. Alternatively, if a kiosk type of remote station is used, the player can directly select the game parameters. The remote stations also transfer the selected game parameters to the central station for subsequent transfer to a game generator.

As noted, the game generator may be connected to a central station and configured for data communications therebetween. For example, the central station can transfer the selected game parameters to the game generator using a wide area network, and the game generator can transfer data regarding the winning results to the remote vendor stations through the central station. Direct communications between the game generator and the remote vendor stations can be accomplished in a similar manner.

The game generator includes memory which stores a plurality of video images representing a plurality of game events. Preferably, the video images are animated representations of the particular game event. Each game event is randomly selectable by the game generator and the selected event is retrieved from memory and formatted for broadcast over, for example, public broadcasting mediums.

Preferably, the game events are races, e.g., horse races, dog races, automobile races, and the like, which include many participants, e.g., jockeys and horses, dogs, and cars and drivers. In this configuration, the memory in the game generator may store animated races for different winning combinations corresponding to the number of participants in the race. For example, if the race is a horse race with twelve horses and jockeys participating, the game generator memory can store an animated race for each winning combination of the twelve horses that win, place and show.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

The present invention provides a computerized lottery (or wagering) system that connects a game generator to a central on-line lottery station and to a plurality of on-line vendor stations. The system of the present invention permits players to select game parameters from remote locations, transfer the selected parameters to the central station, and broadcast the lottery game on television for public viewing.

The broadcasted game may be a race wherein the game parameters are numbers associated with the participants in the race. The types of lottery games contemplated include games where the player can select predefined game parameters, such as characters, letters or numbers. Examples of the games contemplated include (without limitation) horse races, dog races, car races and motorcycle races. At a predefined time of day, selection of the game parameters is ended for a particular game and the game is then broadcast on television so that the players can watch the game and root for their selections. In addition, the system of the present invention determines which players are eligible for a grand prize pool and after the broadcast of the game announces the grand prize winner.

For the purposes of the present application, the lottery game discussed is a horse racing game wherein players have three ways in which to win: 1) picking the winning horse; 2) picking the win and place horses (a perfecta); and 3) picking the win, place and show horses (a trifecta). The players eligible for the grand prize are the trifecta winners.

The game generator or an operator randomly selects the numbers associated with the win, place and show horses before each game is played. The game generator retrieves from memory a predefined video of a race associated with the selected winning numbers. This video is broadcasted using standard television transmission techniques for viewing by a wide audience.

Figure 1:
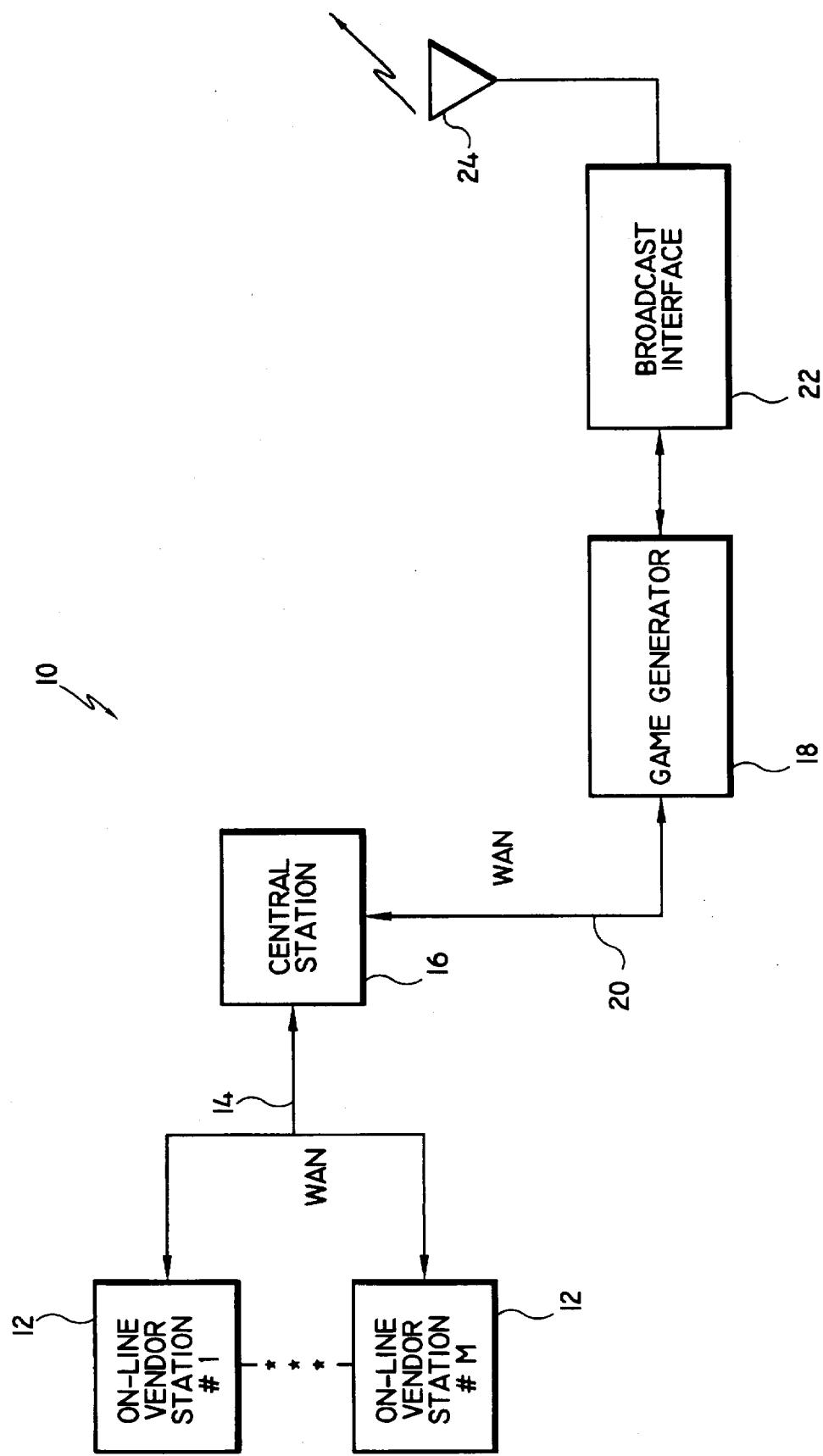
FIG. 1 is a block diagram of the lottery system according to the present invention.

Turning to the figures, in particular FIG. 1, a block diagram for the lottery system according to the present invention is shown. The lottery system 10 includes a plurality of remote on-line vendor stations 12 that are linked over a wide area network (WAN) 14 to a central station 16. A game generator 18 is connected to the central station 16 over a wide area network 20. In this configuration, the central station 16 acts as a communication interface between the game generator 18 and the remote on-line vendor stations 12. As a result, the game generator of the present invention can connect to existing lottery systems having a plurality of remote on-line vendor stations connected to a central station.

Alternatively, the game generator 18 can be connected directly to the plurality of remote vendor stations 12 and displayed on, for example closed circuit television. In this configuration, the system of the present invention does not need to be connected to an existing lottery system.

To broadcast the video of the race, the game generator 18 is connected to a broadcast interface 22 which formats the video data stored in the game generator 18 memory for broadcast via antenna 24. In this configuration, the broadcast interface is configured for RF transmission of television signals. The video is transferred in accordance with known RF transmission methods. Alternatively, the broadcast interface can be configured to format the video data for microwave transmission to satellites and reception by the public on conventional satellite dishes. In another alternative configuration, the broadcast interface can be configured to transmit the video along fiber optic cabling or on closed circuit television lines.

Figure 2:
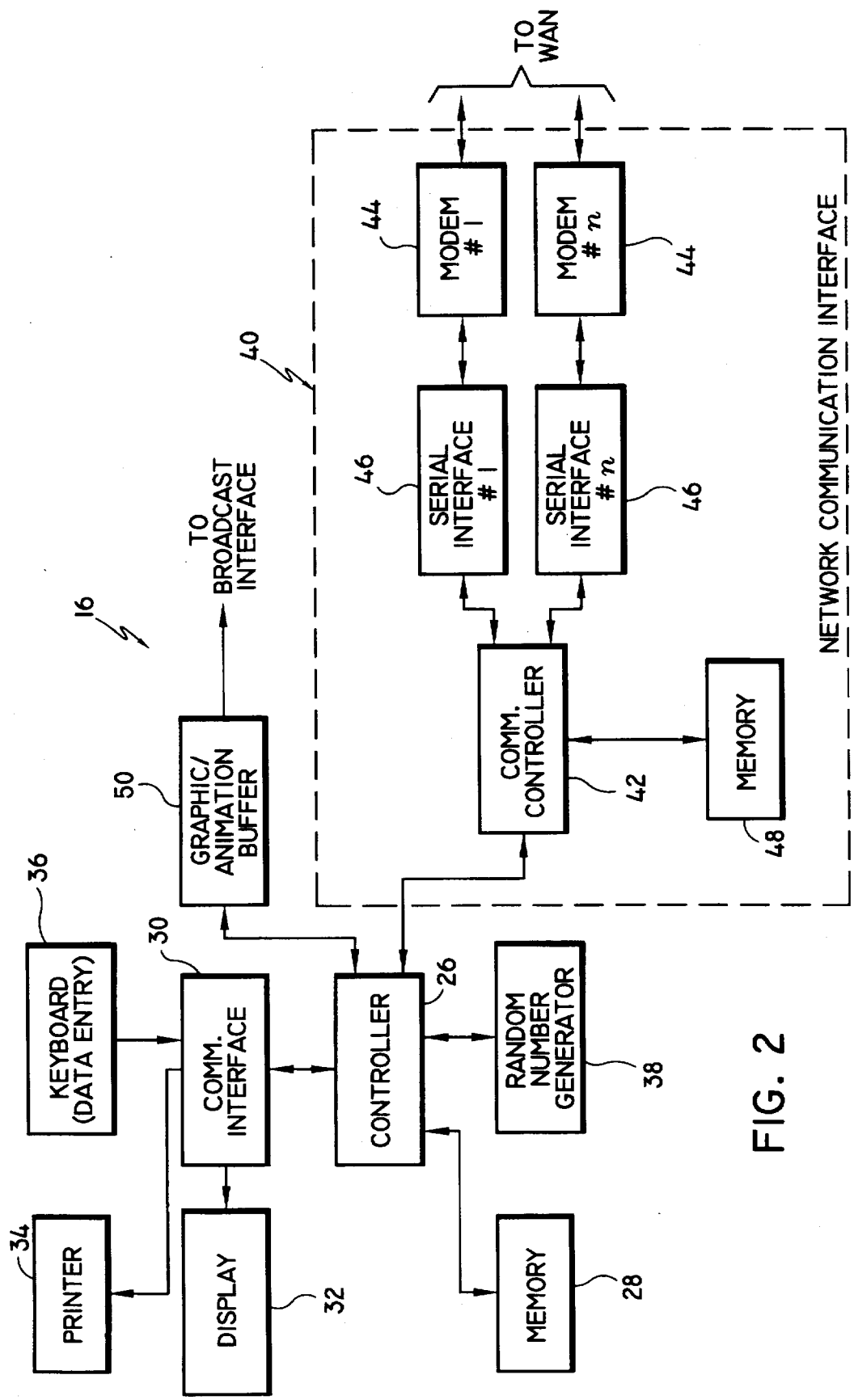
FIG. 2 is a block diagram of an exemplary embodiment of the internal components of the central station of FIG. 1.

Referring now to FIG. 2, the game generator 18 preferably includes a microprocessor based controller 26 having memory 28 for storing programs, such as system and application programs. Memory 28 is also provided with sufficient storage capacity to store numerous video images associated with the particular game or race. To illustrate, as noted above, the described lottery game is a horse race. In each race twelve horses are competing. Thus, for win, place and show results there are 1,320 possible winning combinations, that is, there are 1,320 possible outcomes representing twelve horses taken three at a time. As a result, any one of 1,320 races can be broadcasted depending on the preselected outcome. The races are preferably animated versions of a horse race, and as noted above the outcome for the race is predetermined by the central station.

To create high quality animated horse races, each of the twelve horses are modeled and animated and then combined with modeled and animated backgrounds to create the horse race. The animated race is then voiced over with a race call and crowd and horse background noise to provide a realistic horse race.

Modeling of the horses and jockeys is accomplished by capturing the motions of real horses and jockeys on a treadmill using known motion capturing techniques. A computer may then be used to process the captured data and combine the captured motions with animated horses and jockeys. Once each horse and jockey are animated, the twelve horses are combined with the animated background to complete the animated race. Animation may be accomplished in accordance with a number of computer generated animation techniques, such as the methods disclosed in U.S. Pat. Nos. 4,873,585, 4,752,836, and 4,257,107, the contents of which are incorporated herein by reference.

Returning to FIG. 2, controller 26 is connected to communication interface 30 to provide serial and/or parallel data communications between display 32, printer 34, keyboard 36 and the controller 26.

A random number generator 38 may be included in the game generator 18 to randomly select the winning numbers representing the win, place and show horses, prior to the broadcast of the race. The random number generator may be a hardware based number generator or a program based number generator. Alternatively, a station operator can randomly select the winning numbers representing the win, place, and show horses and enter the numbers into the central station via keyboard 36.

The game generator 18 also includes a network communication interface 40 that is configured for bidirectional communications with the various remote on-line vendor stations 12 linked to the system. In one embodiment, the network communication interface 40 includes a microprocessor based communication controller 42 having memory and stored programs (e.g., system and application programs). The controller 42 is connected to modems 44 via serial interfaces 46. Depending upon the communication requirements of the system, i.e., the communication traffic, there may be a number of modems and corresponding serial interfaces 46 to accommodate a large number of remote player stations. The serial interfaces 46 provide a serial data buffer to communication controller 42. Memory 48 is connected to communication controller 42 and is provided to temporarily store valid data received from the network for subsequent transfer to the game generator controller 22.

As noted above, the game generator controller 22 retrieves predefined video of the game (e.g., a horse race) from memory 28 and transfers the video to a broadcast interface 22. The video data is preferably in digital form and may be formatted by, for example, a graphic/animation buffer 50 for transfer to the broadcast interface 22.

Figure 3:
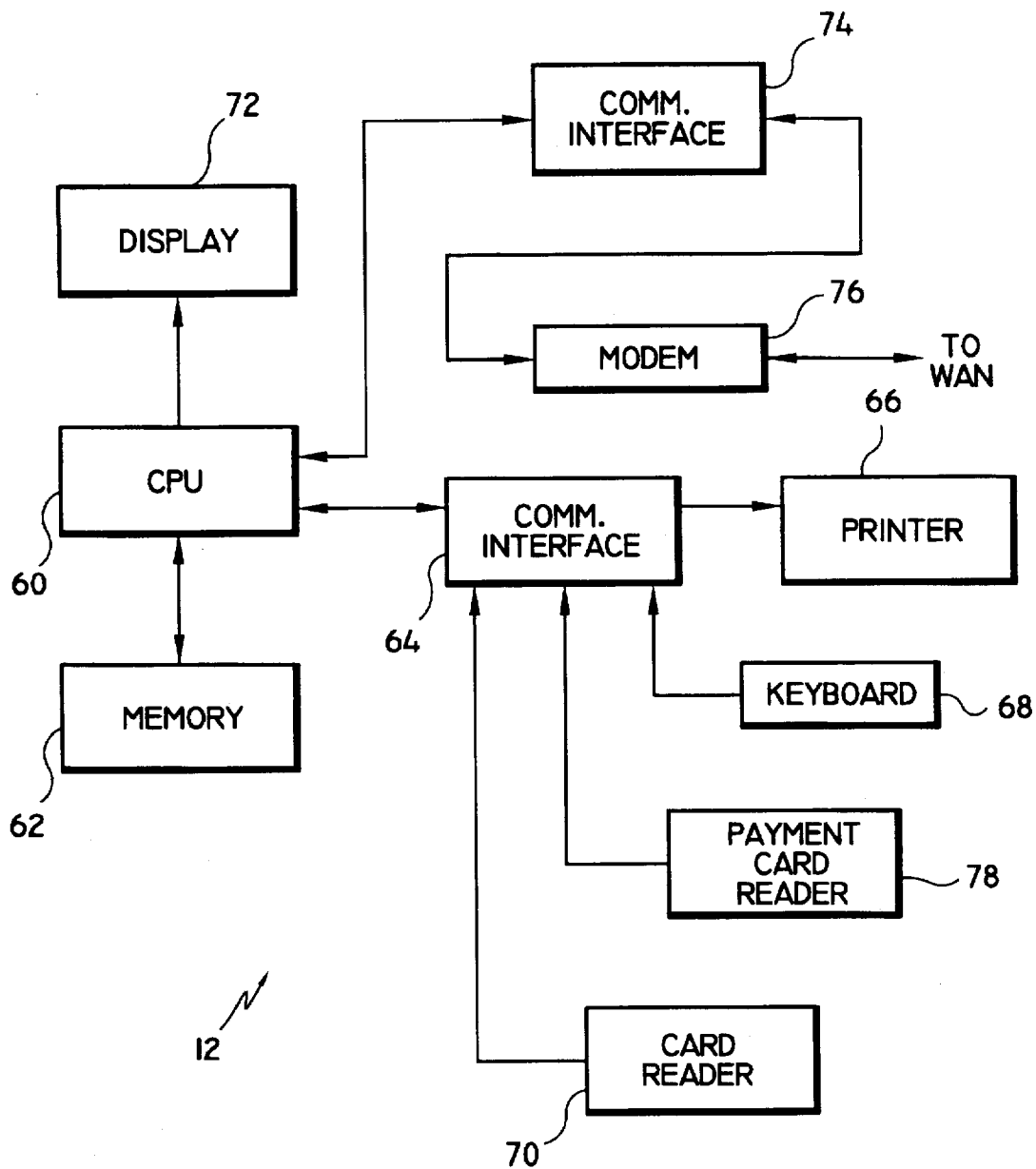
FIG. 3. is a block diagram of an exemplary embodiment of the internal components of the remote player station of FIG. 1.

Referring now to FIG. 3, the remote on-line vendor stations 12 will be described. Generally, each remote on-line vendor station is configured for operation by a user, e.g., store personnel, or for operation directly by the player. The user or player enters the game parameters, for example, the numbers of the horses that will win, place and show, and pays for the game at the site of the remote station. The user-entered game parameters are hereinafter defined as the player selection data.

Preferably, each remote on-line vendor station 12 includes a central processing unit 60 connected to memory 62 having stored therein system and application programs. The memory may include RAM, ROM and mass storage memory devices. A communication interface 64 is connected between the CPU 60 and printer 66, keyboard 68, and card reader 70 for user communication with the remote on-line vendor station 12. The CPU 60 is connected to a display 72, such as a LCD display, a monitor and the like, to provide visual messages or prompts to the user or player.

Communication interface 74 is connected to the wide area network 14 via modem 76 and the remote station CPU 60 to facilitate data communication between the remote on-line vendor stations 12 and the central station 16.

In this configuration, the remote on-line vendor station 12 is configured for installation in, for example, a retail store and operated by personnel within the store. The player (or customer) selects, for example, the numbers of the horses that will win, place and show (i.e., the trifecta) and the operator can either enter the numbers via keyboard 68 or card reader 70. Player selection data is stored in memory 62 along with corresponding player identification data. The player identification data may be the player's social security number or other indicia which associate the player with the player selection data.

As noted above, the remote on-line vendor stations may be existing vendor stations connected to an existing on-line central lottery station.

Figure 4:
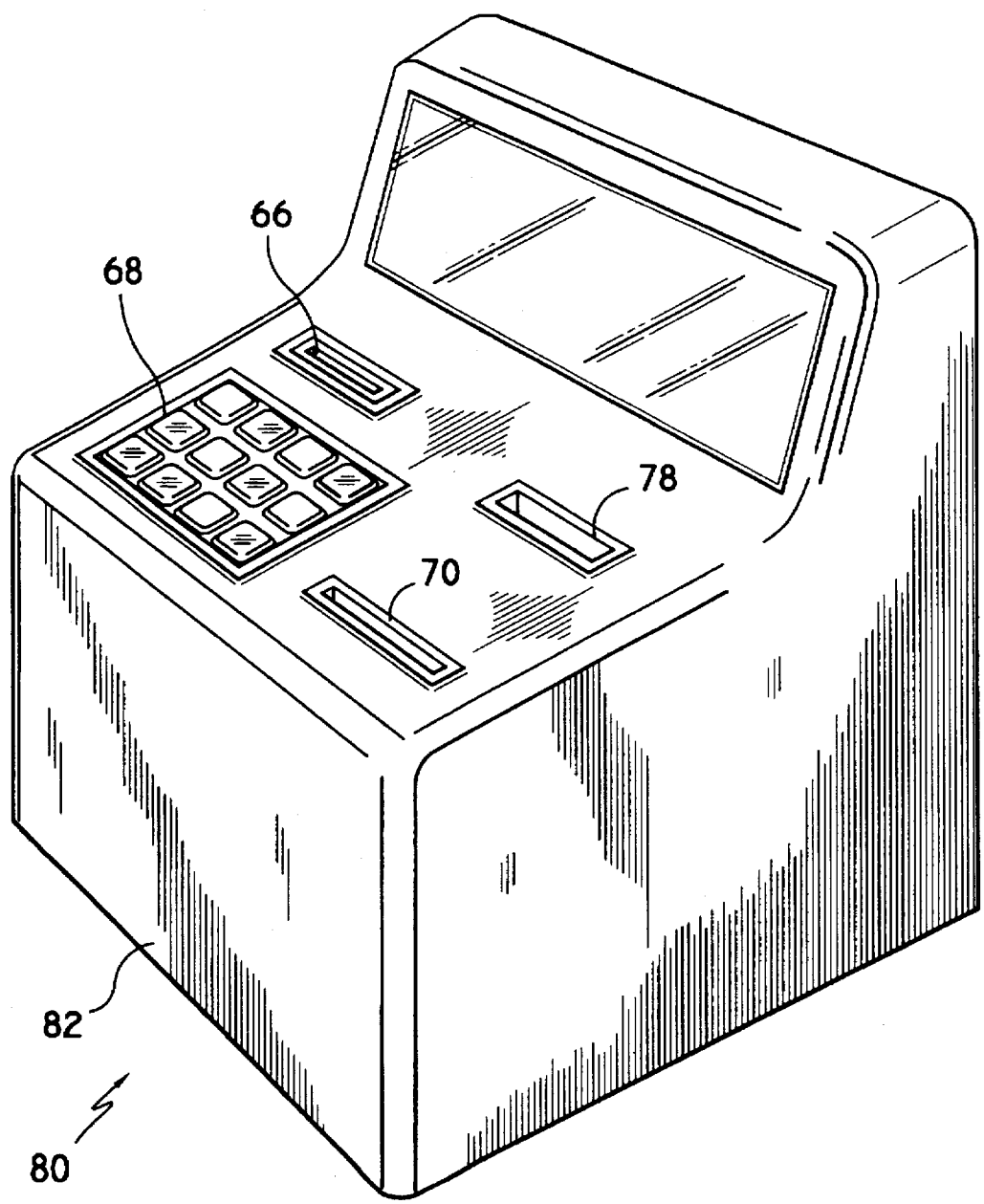
FIG. 4. is a perspective view of an alternative embodiment for the remote station, illustrating a kiosk for the remote station.

In an alternative configuration, the remote on-line vendor 12 may be a kiosk 80, seen in FIG. 4. The internal components for the kiosk 80 are shown in FIG. 3. The kiosk 80 includes a stand alone housing 82 that may be located in public locations, such as shopping malls, and players can enter player selection data via keyboard 68 or card reader 70. In this embodiment, payment for the entry into the lottery may be made by cash or by a payment card medium, such as credit card, a debit card or the like, which is inserted into card reader 78. A ticket or receipt of the transaction is provided by printer 66.

Figure 5:
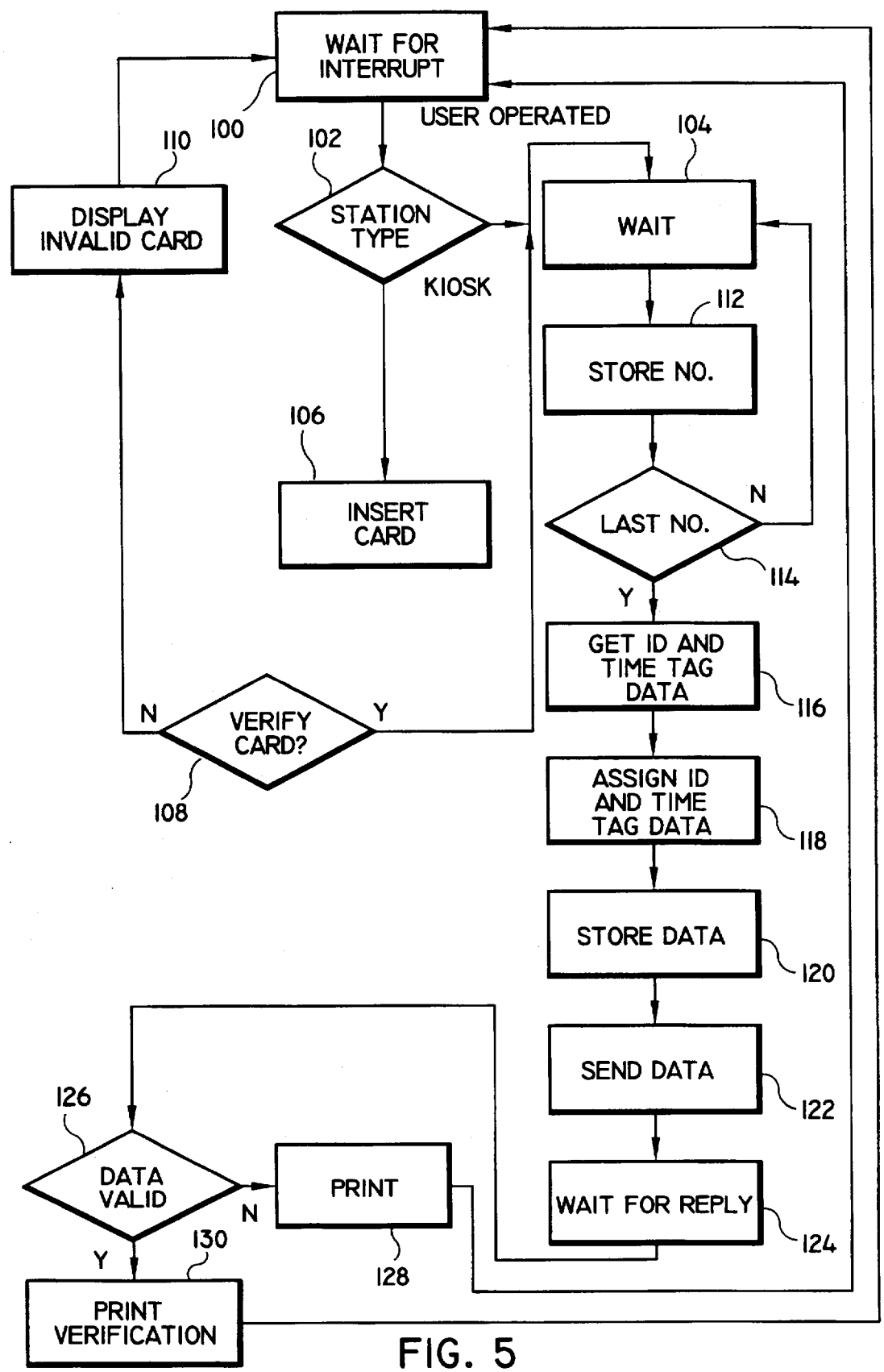
FIG. 5. is an exemplary flow diagram for the operation of the remote station of FIG. 3 or FIG. 4.

FIG. 5 is an exemplary flow diagram of the operation of the remote on-line vendor stations 12. Initially, the remote station is maintained in a idle state (step 100) wherein the display 72 can be continuously updated to show for example, statistical data and to provide instructions regarding how to enter player selection data. Once an interrupt is received by the CPU 60, the CPU initiates a data entry routine. If the remote station is operated by a user, the station prompts the user to enter the player selection data which as noted above can be entered by keyboard 68 or card reader 70 (steps 102 and 104). If the remote station is a kiosk, the player is prompted to insert a payment card into card reader 78 (steps 102 and 106). The CPU 60 then verifies that the card is valid by, for example, automatically contacting known credit agencies via modem 76 (step 108) and receiving a code indicating whether the card is valid or not. If the card is invalid, then the player is notified that the transaction cannot be completed on display 72 and the station returns to the idle state (steps 110 and 100). If the card is valid, the player is instructed to enter the player selection data (step 104).

Using either type of remote on-line vendor station, when the player selection data is entered, the CPU 60 stores the data in memory 62, typically in RAM (step 112). In the horse race example, the numbers of the win, place and show horses are entered and stored until the last number is entered (step 114). Once the player selection data is completely entered, CPU 60 instructs the user to enter identification data which will be associated with the player selection data for verification purposes in the event the player chooses the correct win, place or show horse or qualifies and wins the grand prize (step 116). As noted, an example of player identification (ID) data is a social security number. In addition to requesting player ID data, CPU 60 retrieves the time of day and date (i.e., time tag data) from a clock (not shown) within the remote station (step 118) to associate the player selection data with a particular time and day for determining if the player has a winning ticket. The ID data and the time tag data are stored in memory along with the corresponding player selection data (step 120).

Once the player selection data, the player ID data and the time tag data are stored, the data is sent to the game generator 18 through the central station 16 and modem 76 (step 122). If the remote on-line vendor stations are connected directly to the game generator then data is sent to the game generator over the WAN. After the data is transmitted to the game generator 18, the remote station waits for the game generator to reply that it received the player selection and associated ID and time tag data (step 124). If the reply is that the data received was invalid (step 126), the user or player is notified via display 72 and/or printer 66 that a transmission error occurred and the station returns to the idle state (steps 128 and 100). If the reply is that the data transfer is complete (step 126) the player selection data and associated ID and time tag data are printed on printer 66 to provide the player with a receipt of the transaction which can be used by the player to claim any winnings (step 130). Once the receipt is printed, the station returns to the idle state of step 100.

Figure 6:
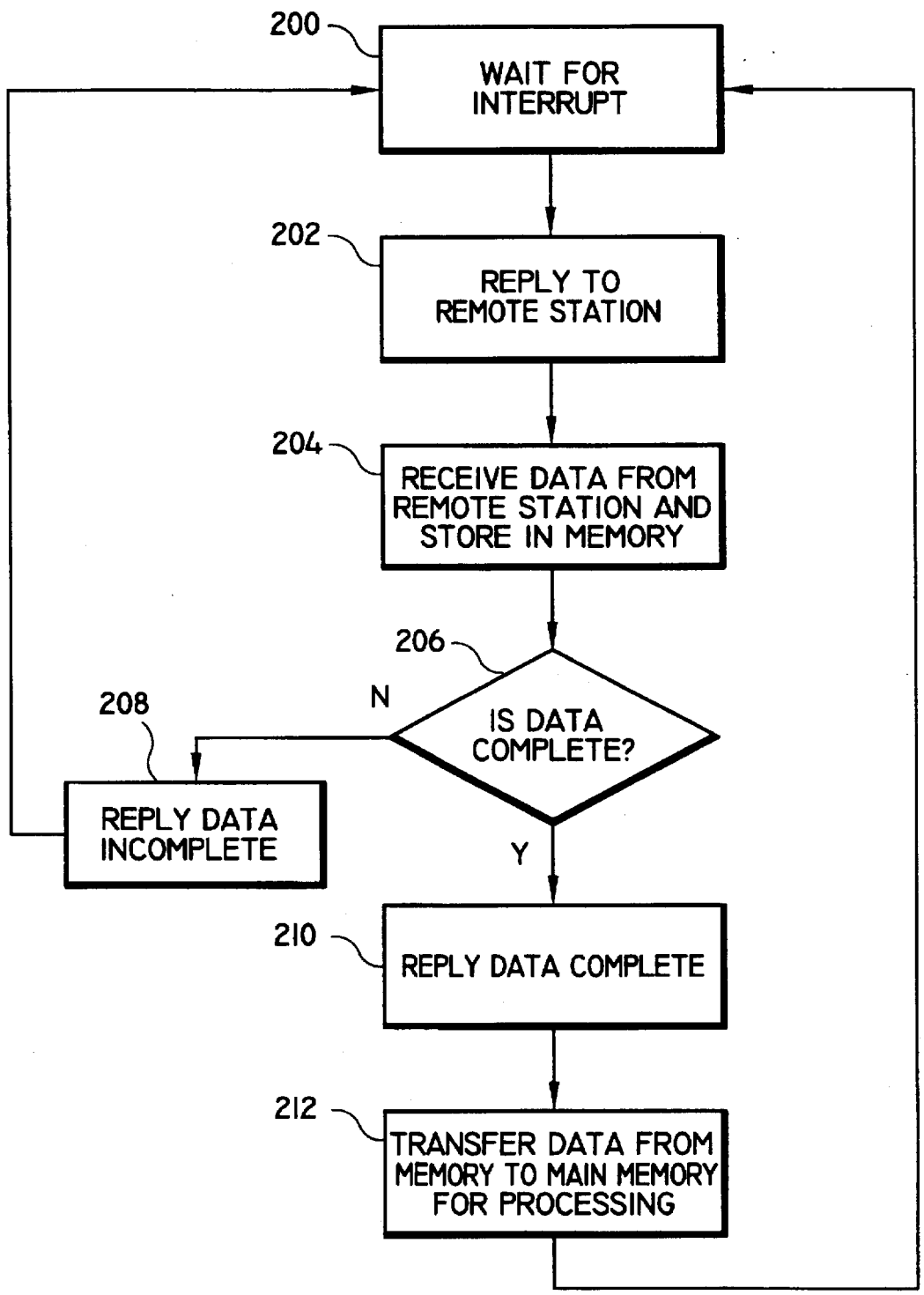
FIG. 6. is an exemplary flow diagram for the operation of the central station receiving player selection data from a remote station.

FIG. 6 is an exemplary flow diagram of the transfer of data to the game generator. The game generator is initially in an idle state (step 200) and upon receiving an interrupt performs the desired routine. In FIG. 6, the interrupt may be a request from the remote station to send player selection data to the game generator. When the remote station requests to send data, the game generator provides a reply indicating that the game generator is or is not ready to receive the data (step 202). When the game generator is ready to receive data, the remote station sends the data to the game generator which stores the data in the network communication interface memory 48, seen in FIG. 2 (step 204). The network communication interface controller determines if the data transaction is complete (step 206). If the data transaction is incomplete, the game generator replies to the remote station that the transaction is incomplete and returns to the idle state (steps 208 and 200). If the data transaction is complete, the game generator replies that the transaction is complete and transfers the player selection, the ID and the time tag data to the main memory 24, seen in FIG. 2 (steps 210 and 212).

Figure 7:
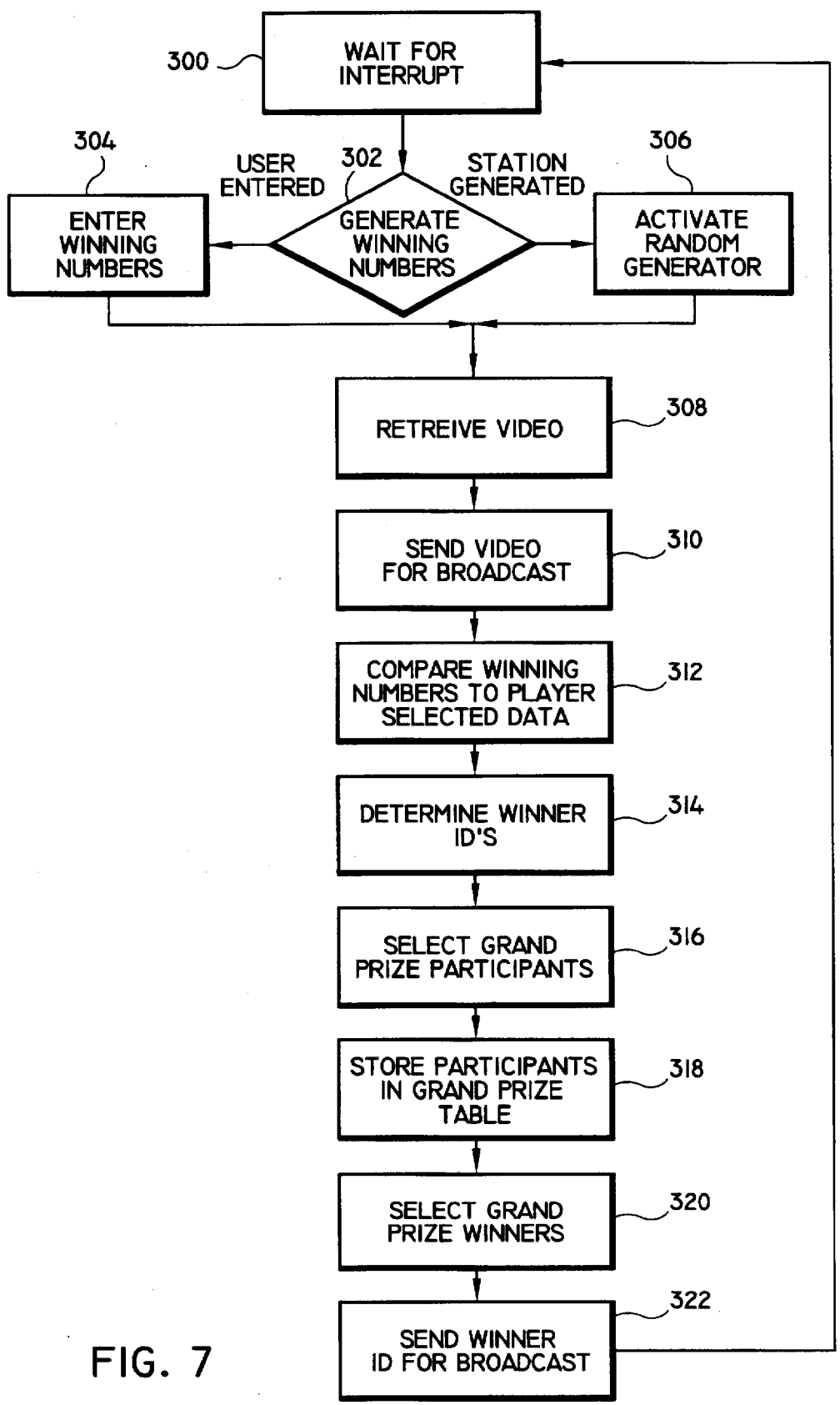
FIG. 7. is an exemplary flow diagram for the operation of the central station performing the lottery game according to the present invention.

FIG. 7 is an exemplary flow diagram of the operation of the game generator for generating the lottery results. Initially, the game generator 18 is in an idle state (step 300) and upon receiving an interrupt, for example, a user selected start command, the generator determines what the winning numbers are for a particular day. The winning numbers can be randomly chosen and entered into the generator by a user via keyboard 36 (steps 302 and 304), or by random number generator 38 (steps 302 and 306). Once the winning numbers are generated, the controller 26 retrieves the corresponding video having an outcome that corresponds to the randomly generated winning numbers (step 308). The retrieved video of the race is then transferred via the broadcast interface 22 for broadcast, as described above (step 310). Before broadcasting the video of the race, the game generator compares the preselected winning numbers to all the entries of player selection data (step 312) and determines the number of winners (step 314). The game generator controller 22 then determines which players qualify for the grand prize (step 316). As noted above in the horse racing example, one criterion for determining the grand prize participants is to select all the players who selected the trifecta. The identities of the grand prize participants may be stored in, for example, a grand prize data table (step 318) and the winner of the grand prize may be randomly selected by the random number generator 38 (step 320). Once the winner of the grand prize is selected, the name of the winner is broadcasted after the race (step 322).

It will be understood that various modifications can be made to the embodiments of the present invention herein without departing from the spirit and scope thereof. For example, various types of network resources and protocols may be used for the wide area network and various central and remote station configurations may be employed. Likewise, various animation techniques may be used to recreate the races by which the lottery winner is announced. Therefore, the above description should not be construed as limiting the invention, but merely as disclosing preferred embodiments thereof. Those skilled in the art will envision other modifications within the scope and spirit of the invention as defined by the claims appended hereto.

What is claimed is:

1. A method of conducting a lottery, comprising:
   (a) issuing a plurality of lottery tickets each bearing a sequence-specific subset of K different integers selected from a predetermined set of integers, K being a predetermined constant, a number of integers in said set being larger than K, said plurality of tickets including tickets respectively bearing different sequence-specific subsets of K integers of said set;
   (b) assigning to each issued ticket a unique multidigit identifier;
   (c) storing the identifier of all issued tickets for selective retrieval of all identifiers of issued tickets bearing any given sequence-specific subset of integers;
   (d) after completion of step (a), randomly selecting one sequence-specific subset of K different integers from said set;
   (e) selectively retrieving from storage the identifier of all issued tickets bearing said one sequence-specific subset; and
   (f) randomly selecting one identifier retrieved in step (e), a ticket to which said one identifier is assigned being a winning ticket of the lottery.

2. A method according to claim 1, wherein K is 3, and further including the step of generating an animated video display representing a horse race after completion of step (d), said horse race having a number of horses equal to the number of integers in said set and respectively designated in said display by the integers of said set, said display being so generated that there are win, place and show horses therein, respectively designated by the first, second and third integers of said one sequence-specific subset.

3. A method of conducting a horse-race lottery, comprising the steps of:
   (a) at each of plural remote stations in information-transmitting connection with a central station, issuing a plurality of lottery tickets each bearing a sequence-specific subset of three different integers selected from a predetermined set of more than three integers, said plurality of tickets including tickets respectively bearing different sequence-specific subsets of three integers of said set, while
   (b) assigning to each issued ticket a multidigit identifier, such that all tickets bearing the same sequence-specific subset of integers have a different identifier, each ticket having the corresponding assigned multidigit identifier printed thereon;
   (c) transmitting to and storing at said central station the identifier of all issued tickets for selective retrieval of all identifiers of issued tickets bearing any given sequence-specific subset of integers;
   (d) at said central station, after completion of step (a), randomly selecting one sequence-specific subset of three different integers from said set;
   (e) at said central station, after completion of step (d), generating and broadcasting an animated video display representing a horse race having a number of horses equal to the number of integers in said set and respectively designated in said display by the integers of said set, said display being so generated that there are win, place and show horses therein, respectively designated by the first, second and third integers of said one sequence-specific subset; and (f) at said central station, selectively retrieving from storage the identifier of all issued tickets bearing said one sequence-specific subset and randomly selectively one of the retrieved identifiers; wherein issued tickets bearding sequence-specific subsets in which the integer designating the win horse is the first integer are first-order winning tickets of the lottery, issued tickets bearing sequence-specific subsets in which the integers designating the win and place horses are the first two integers in sequence are second-order winning tickets of the lottery, issued tickets bearing said one sequence-specific subset are third-order winning tickets of the lottery, and the ticket to which said one identifier is assigned is a unique fourth-order winning ticket of the lottery.

4. A lottery system, which comprises:

a plurality of remote vendor stations connected to a central station, said plurality of remote vendor stations being configured to provide predetermined game parameters to a player for selection, and to transfer selected game parameters to said central station; and a game generator connected to said central station and configured for data communications therebetween including said selected game parameters, said game generator having stored therein a plurality of video images representing a plurality of game events, said plurality of game events being randomly selected for broadcast.

5. The lottery system according to claim 4, wherein said plurality of game events are races having a plurality of participants, each race being randomly selectable.

6. The lottery system according to claim 5, wherein each of said plurality of races represents a race with a different winning combination for said plurality of race participants.

7. The lottery system according to claim 5, wherein said video images represent a plurality of horse races and said plurality of participants are horses.

8. The lottery system according to claim 7, wherein each of said plurality of horse races represents a race with a different combination of win, place and show horses for said plurality of horses.

9. A lottery system having a plurality of remote vendor stations connected to a central lottery station, said plurality of remote vendor stations being configured to provide predetermined game parameters to a player for selection, and to transfer selected game parameters to the central station, said lottery system comprising:

a game generator connected to the central station and configured for data communications therebetween including the selected game parameters, said game generator having stored therein a plurality of video images representing a plurality of animated game events, said plurality of game events being randomly selected for broadcast.

* * * * *